United States Patent
Jagadeesan et al.

(10) Patent No.: US 8,180,334 B2
(45) Date of Patent: May 15, 2012

(54) SYSTEM AND METHOD FOR LEVERAGING A CALLER ID TO PROVIDE A REVERSE SIGNALING PATHWAY IN A NETWORK ENVIRONMENT

(75) Inventors: Ramanathan T. Jagadeesan, San Jose, CA (US); Bich T. Nguyen, Los Altos, CA (US); Andrew C. Chung, Fremont, CA (US); Christopher E. Pearce, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 343 days.

(21) Appl. No.: 11/291,065

(22) Filed: Nov. 29, 2005

(65) Prior Publication Data

US 2007/0123238 A1    May 31, 2007

(51) Int. Cl.
*H04M 3/42*    (2006.01)
*H04W 40/00*    (2009.01)

(52) U.S. Cl. ........................................ 455/417; 455/445

(58) Field of Classification Search ................ 455/436, 455/433, 552, 415–417, 445; 370/328, 349, 370/260–266
See application file for complete search history.

(56) References Cited

U.S. PATENT DOCUMENTS

| | | | |
|---|---|---|---|
| 5,577,029 A | 11/1996 | Lu et al. ........................... | 370/54 |
| 5,887,256 A | 3/1999 | Lu et al. ......................... | 455/426 |
| 5,943,332 A | 8/1999 | Liu et al. ........................ | 370/342 |
| 6,002,679 A | 12/1999 | Liu et al. ........................ | 370/335 |
| 6,016,318 A | 1/2000 | Tomoike ......................... | 370/401 |
| 6,141,545 A | 10/2000 | Begeja et al. ................... | 455/417 |
| 6,181,928 B1 | 1/2001 | Moon ............................. | 455/415 |
| 6,405,040 B1 | 6/2002 | Liu et al. ........................ | 455/435 |
| 6,411,632 B2 | 6/2002 | Lindgren et al. .............. | 370/466 |
| 6,539,237 B1 | 3/2003 | Sayers et al. ................... | 455/555 |
| 6,546,425 B1 | 4/2003 | Hanson et al. ................. | 709/227 |
| 6,611,689 B1 | 8/2003 | Cartigny et al. ............... | 455/461 |
| 6,647,426 B2 | 11/2003 | Mohammed ................... | 709/238 |
| 6,687,360 B2 | 2/2004 | Kung et al. .............. | 379/211.02 |
| 6,748,054 B1 | 6/2004 | Gross et al. ................. | 379/88.12 |
| 6,771,953 B1 | 8/2004 | Chow et al. .................... | 455/417 |
| 6,807,431 B2 | 10/2004 | Sayers et al. ................... | 455/555 |
| 6,826,173 B1 | 11/2004 | Kung et al. .................... | 370/352 |
| 6,888,808 B2 | 5/2005 | Jagadeesan et al. ........... | 370/328 |
| 6,961,559 B1 | 11/2005 | Chow et al. ................. | 455/414.1 |
| 2001/0046214 A1 | 11/2001 | Kang ............................. | 370/328 |
| 2002/0085517 A1* | 7/2002 | Lee et al. ....................... | 370/331 |

(Continued)

OTHER PUBLICATIONS

J. Rosenberg, "A Session Initiation Protocol (SIP) Event Package for Registrations," Network Working Group, RFC 3680, 22 pgs., Mar. 2004.

(Continued)

*Primary Examiner* — Michael Faragalla
(74) *Attorney, Agent, or Firm* — Baker Botts L.L.P.

(57) ABSTRACT

A method for providing signaling in a network environment is provided that includes receiving, at a mobile station, a new call from a mobility application, the new call including a caller ID segment associated with an existing call for the mobile station. The method further includes evaluating data included in the caller ID segment in order to perform an activity related to the data provided in the caller ID segment.

22 Claims, 2 Drawing Sheets

U.S. PATENT DOCUMENTS

| | | | | |
|---|---|---|---|---|
| 2003/0134638 | A1 | 7/2003 | Sundar et al. | 455/435 |
| 2003/0134650 | A1 | 7/2003 | Sundar et al. | 455/465 |
| 2003/0224795 | A1 | 12/2003 | Wilhoite et al. | 455/445 |
| 2004/0037324 | A1 | 2/2004 | Heubel et al. | 370/493 |
| 2004/0087307 | A1 | 5/2004 | Ibe et al. | 455/436 |
| 2004/0127208 | A1 | 7/2004 | Nair et al. | 455/420 |
| 2004/0146021 | A1 | 7/2004 | Fors et al. | 370/331 |
| 2004/0266426 | A1 | 12/2004 | Marsh et al. | 455/426.2 |
| 2006/0015864 | A1* | 1/2006 | Kang | 717/173 |
| 2006/0270447 | A1* | 11/2006 | Everson et al. | 455/552.1 |
| 2006/0294245 | A1* | 12/2006 | Raguparan et al. | 709/227 |

OTHER PUBLICATIONS

M. Garcia-Martin, E. Henrikson, and D. Mills, "Private Header (P-Header) Extensions to the Session Initiation Protocol (SIP) for the 3rd-Generation Partnership Project (3GPP)," Network Working Group, RFC 3455, 29 pgs., Jan. 2003.

Global System for Mobile Communications,"3rd Generation Partnership Project; Technical Specification Group Services and System Aspects; Report on alternative architectures for combining CS Bearers with IMS; Release 6," http://www.3gpp.org, 28 pgs., 2004.

\* cited by examiner

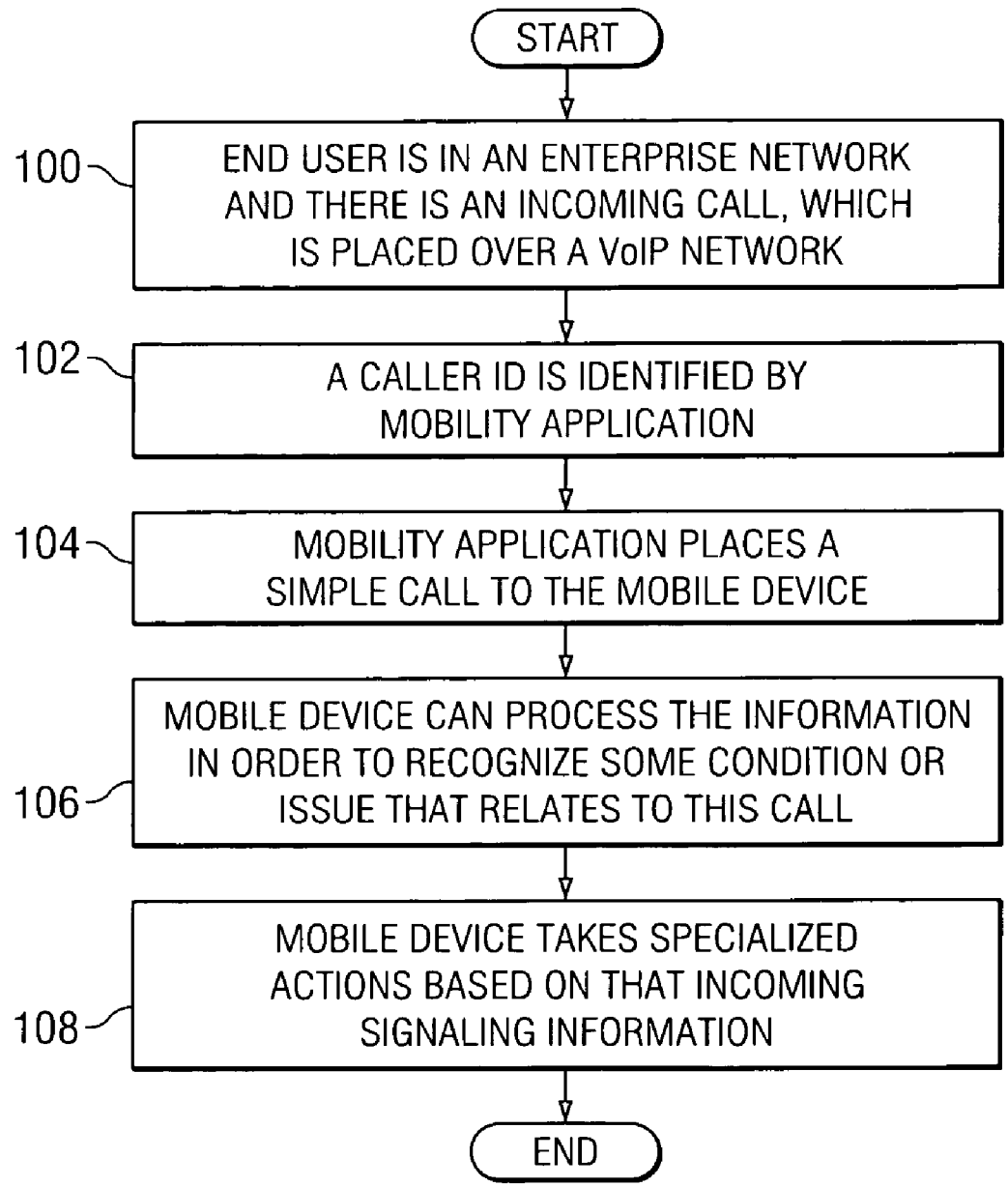

SYSTEM AND METHOD FOR LEVERAGING A CALLER ID TO PROVIDE A REVERSE SIGNALING PATHWAY IN A NETWORK ENVIRONMENT

TECHNICAL FIELD OF THE INVENTION

The present invention relates generally to network communications and, more particularly, to a system and a method for leveraging a caller ID to provide a reverse signaling pathway in a network environment.

BACKGROUND OF THE INVENTION

Networking architectures have grown increasingly complex in communications environments. In recent years, a series of protocols and architectures have been developed in order to accommodate a diverse group of end users having various needs. Some of these protocols relate to issues associated with handoffs.

As both public and private network systems grow in size and in sophistication, proper routing and efficient management of communication sessions and data flows becomes even more critical. In cases where protocols are unable to accommodate a given service or feature, an end user is precluded from enjoying the benefits of a given communication architecture. Advances in technology have resulted in the deployment of various types of wireless networks.

However, while most of these wireless networks often provide service to adjacent and/or overlapping physical spaces, most cellular and enterprise network protocols are incompatible. Accordingly, the ability to provide an effective mechanism to properly process and direct communications for an end user seeking to realize the benefits provided by multiple network environments offers a significant challenge to network operators, component manufacturers, and system designers.

SUMMARY OF THE INVENTION

In accordance with some of the teachings of the present invention, techniques for offering optimal signaling in circuit-switched cellular and/or packet-switched wireless networks are provided. According to some embodiments, these techniques enable a mobile station to recognize and process incoming signaling data such that the mobile device can respond to the incoming data in an appropriate fashion. In particular, these techniques can enable a mobile station, alone or in combination with a mobility application, to properly synchronize calls, account for issues/conditions that arise in the network, or offer an awareness to the end user who is associated with the corresponding network communications.

According to a particular embodiment, a method for providing signaling in a network environment is provided that includes receiving, at a mobile station, a new call from a mobility application, the new call including a caller ID segment associated with an existing call for the mobile station. The method further includes evaluating data included in the caller ID segment in order to perform an activity related to the data provided in the caller ID segment.

In more specific embodiments, the caller ID segment is received after the mobile station has roamed from an enterprise network to a cellular network and experienced a handoff. In yet more specific embodiments, the caller ID segment is used to signal to the mobile device to initiate another call. In other embodiments, the caller ID segment addresses a real-time condition associated with the mobile device, or the caller ID segment is used to address 3rd party control issues.

Embodiments of the invention provide various technical advantages. For example, the architecture of the present invention provides improved signaling for the end user. The configuration of the present invention utilizes a reverse signaling pathway to achieve this effect. Specifically, the present invention operates to place a call to the mobile device such that the mobile device can process the incoming information (e.g. recognize the condition being indicated by the incoming data). Hence, the handset or mobile device can process this information and react accordingly. This affords the ability for the mobile device to properly synchronize communication flows or to address issues (e.g. voice-mail) that occur in the network.

Moreover, this new signaling pathway can be used to encode any given data. The functions to be performed (or the data to be recognized) by the mobile station is virtually limitless. This concept effectively addresses the signaling issue (from the enterprise network to the mobile device) and provides real-time communications when another call is already in existence. Another advantage of such a signaling protocol is that the proposed signaling pathway does not offer an increased expense for any network participant (i.e. it is not necessary to build additional infrastructure to perform the outlined operations). Additional details relating to the capabilities of the present invention are provided below with reference to accompanying FIGS. 2 and 3.

Certain technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 3 is a simplified flowchart associated with a method for providing a reverse signaling pathway in the communication system.

DETAILED DESCRIPTION OF THE INVENTION

Figure 1:
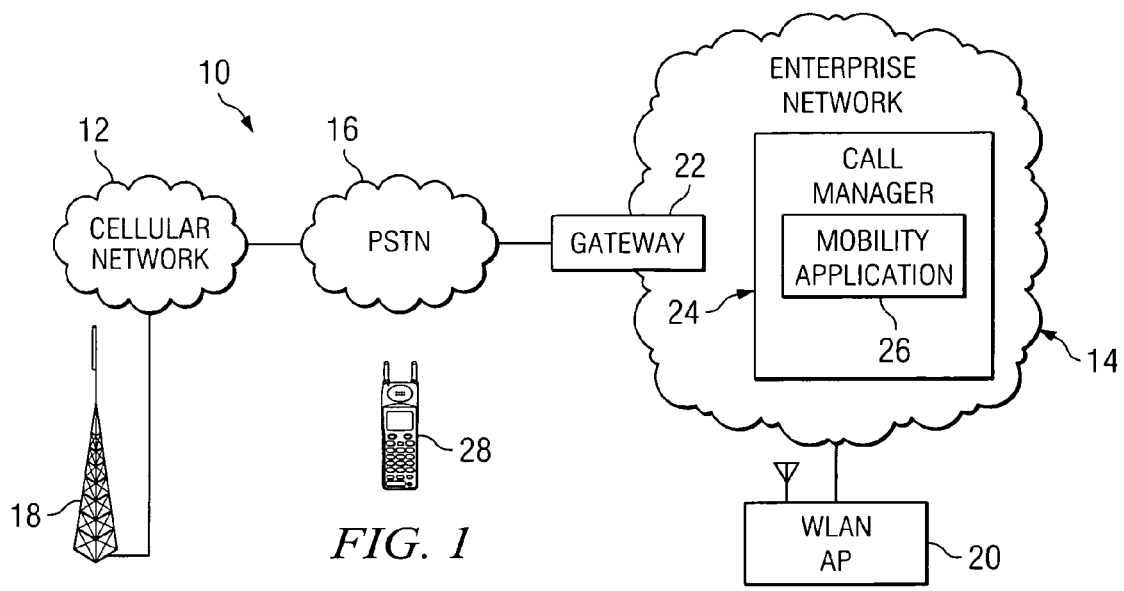
FIG. 1 is a simplified block diagram that illustrates a communication system having elements that offer a reverse signaling pathway in cellular and enterprise networks.

FIG. 1 is a simplified block diagram that illustrates a communication system 10 for providing a reverse signaling pathway in a network environment. Communication system 10 can use a specially formatted caller ID segment, in conjunction with an intelligent end-user device, to establish a reliable signaling path from an enterprise (private branch exchange) network to the end-user device. This may be performed while the end-user device is in a circuit-switched call, as outlined below.

Communication system 10 comprises a cellular network 12 and an enterprise network 14, which are interconnected through a public switched telephone network (PSTN) 16. One or more base stations 18 are coupled to cellular network 12, and one or more access points 20 are coupled to enterprise network 14. Enterprise network 14 includes a gateway 22, a Call Manager 24 (that is manufactured by Cisco Systems, Inc. of San Jose, Calif.), and a mobility application 26, which can perform one or more operations associated with a handoff server.

Communication system 10 also includes mobile station 28, which may communicate with a remote device through cellular network 12 using base station 18 and/or through enterprise network 14 using a wireless local area network access point (WLAN AP) 20. The elements of communication system 10 can operate to permit mobile station 28 to maintain a communication session that is handed between cellular network 12 and enterprise network 14. According to particular embodiments, mobility application 26 and/or mobile station 28 utilize one or more of various private branch exchange (PBX) functions to effect handoff between cellular network 12 and enterprise network 14.

Prior to discussing the following FIGURES, the problems or situations that are being addressed by the proposed flows should be understood. When an end user is on the cellular network and is on a call, there is often no signaling path to the phone (simultaneously). There can be a voice call or a data call, but not both simultaneously. In the case of a voice call (where there is circuit-switched voice over a cellular network), there is a need to achieve signaling between the enterprise network (e.g. Call Manager and/or the mobility application) and the phone. This can be executed by placing a second call to the phone and conveying whatever information (that is sought to be communicated) in the caller ID segment, which was previously used for making the call.

In this scenario, the caller ID is not a conventional caller ID, as it only represents a set of numbers that have some meaning or signaling. Thus, a protocol could be defined to represent different commands, which are reflected by numeric digits. The commands could correspond to any PBX feature (e.g. any feature to be sent from the network to the phone), such as call waiting for example.

Consider a case where there is one active call and one call on hold. In a given scenario, a first call is generally anchored in the enterprise network such that the enterprise network can perform a handoff. There is an issue that arises when there is more than one call. In-band signaling using Dual-tone multi-frequency (DTMF) can accommodate a toggling between two calls. The mobility application can be used to bridge the inbound call from the mobile station to one of the active PSTN calls and it is also observes the held call.

Pressing a button may readily invoke DTMF codes. However, the mobile station only knows of one call. The held call may clear (i.e. the call is disconnected), but the mobile station is oblivious to this status. There is simply no signaling path on the reverse direction (i.e. DTMF can be sent from the handset to the enterprise network, but not in the reverse direction because it is typically unreliable).

In accordance with the teachings of the present invention, communication system operates to place a call to the handset (i.e. mobile station 28) such that the handset can process the incoming information (e.g. recognize that the held call has disappeared). Now the information associated with the held call can be erased from the call display. This accounts for the inability to properly synchronize the handset, as there is generally no signaling pathway that can be leveraged.

The new signaling pathway (although potentially lethargic) can be used to encode any given data, for PBX feature signaling. The functions to be performed or the data to be recognized by the mobile station is limitless.

Communication system 10 addresses the signaling issue described above (from the enterprise network to the handset) and provides real-time communications when another call is already in existence. The proposed signaling pathway is also free, as it already exists and infrastructure does not need to be built to accommodate this feature. Additional details relating to some of the capabilities of the present invention are provided below and included in conjunction with descriptions of FIGS. 2 and 3.

Cellular network 12 is communications equipment, including hardware and any appropriate controlling logic, for providing wireless telephony services using cellular protocols and technology. Various cellular protocols and technologies may be used by cellular network 12, including but not limited to global system for mobile communications (GSM), time division multiple access (TDMA), code division multiple access (CDMA), and any other appropriate analog or digital cellular protocol or technology. Furthermore, cellular network 12 may utilize signaling system 7 (SS7) protocol for signaling purposes. Cellular network 12 may include any number of base stations 18, as well as base station controllers, mobile switching centers, and other appropriate communications equipment for use in communicating with mobile station 28 and PSTN 16. Thus, as illustrated, cellular network 12 may couple to base station 18 to receive and transmit wireless signals to and from mobile station 28.

Enterprise network 14 represents communications equipment, including hardware and any appropriate controlling logic, for interconnecting elements coupled to enterprise network 14. Thus, enterprise network 14 may represent a local area network (LAN), a wide area network (WAN), and/or any other appropriate form of network. Furthermore, elements within enterprise network 14 may utilize circuit-switched and/or packet-based communication protocols to provide for wireline telephony services. For example, elements within enterprise network 14 may utilize Internet Protocol (IP). In addition, elements within enterprise network 14 may utilize wireless standards such as the 802.11 family of wireless standards to provide for wireless telephony services. Note that the 802.11 family of wireless standards includes, among others, 802.11a, 802.11b, and 802.11g. Enterprise network 14 may also utilize interactive voice response (IVR). Enterprise network 14 may include any number of wireless network devices 20, gateways 22, Call Managers 24, and other appropriate communications equipment for use in communicating with mobile station 28 and PSTN 16. In the embodiment illustrated, enterprise network 14 includes access point 20, gateway 22, Call Manager 24, and mobility application 26. Access point 20 represents communications equipment, including hardware and any appropriate controlling logic, for providing wireless access to enterprise network 14. Access point 20 may utilize one or more of the 802.11 standards. However, any appropriate wireless standard or protocol may be used.

Gateway 22 represents communications equipment, including hardware and any appropriate controlling logic, for interconnecting enterprise network 14 with cellular network 12 and/or PSTN 16. Gateway 22 may be used to convert communications between different communication protocols. For example, gateway 22 may convert communications received from cellular network 12 in SS7 protocol to any of various other protocols that may be used by enterprise network 14, such as protocols associated with the an integrated services digital network (ISDN) standard in the case of circuit-switched trucking and H.323, session initiation protocol (SIP), or other appropriate protocols in the case of IP-based trucking.

Call Manager 24 represents communications equipment or a communications platform, including hardware and any appropriate controlling logic, for providing telephony services over enterprise network 14. For example, Call Manager 24 may support VoIP communications, using any of various protocols such as SIP, signaling connection control point (SCCP) protocol, media gateway control protocol (MGCP), H.323, and/or any other appropriate protocol for VOIP. Furthermore, Call Manager 24 may act as an IP PBX and support PBX functions, such as hold, park, transfer, redirect, and/or other high level and low level call management features.

Mobility application 26 represents a server in one embodiment of the present invention, but alternatively could be replaced with any other appropriate device (e.g. a router, switch, bridge, gateway, etc.) that facilitates the operations detailed herein. Mobility application 26 includes any suitable collection of hardware, software, and controlling logic to support a handoff between cellular network 12 and enterprise network 14 and to facilitate signaling protocol, as outlined herein in this document.

It should also be noted that the internal structure of mobility application 26 and mobile station 28 are malleable and can readily be changed, modified, rearranged, or reconfigured in order to achieve their intended operations as they pertain a handoff function and the signaling protocol. Software and/or hardware may reside in these elements (or in just one) in order to achieve the teachings of the signaling features of the present invention. Hence, software and/or hardware is provided in mobile station 28, which knows how to invoke, process, and recognize cellular features (e.g. HOLD, resume, retrieve, call-waiting, conferencing, transfer, caller-ID, (advanced) display functions, redirect, three-way calling, barging operations, etc.). This processing capability is present when mobile station 28 is on cellular network 12 or when it is on enterprise network 14 (e.g. VOIP network). In addition, modifications/enhancements to mobility application 26 could also be provided in order to offer both (or multiple) calls to mobile station 28.

However, due to their flexibility, these elements (mobility application 26 and mobile station 28) may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structures of mobility application 26 and mobile station 28 in the context of communication system 10 and, accordingly, they should be construed as such.

PSTN 16 represents communications equipment, including hardware and any appropriate controlling logic, through which cellular network 12 and enterprise network 14 may communicate. PSTN 16 may include switches, wireline and wireless communication devices, and any other appropriate equipment for interconnecting cellular network 12 and enterprise network 14. PSTN 16 may include portions of public and private networks providing network transport services between various geographic areas and networks.

Mobile station 28 represents a mobile device, including hardware and any appropriate controlling logic, capable of communicating with remote devices through cellular network 12 and enterprise network 14 and maintaining communication sessions with remote devices during handoff between cellular network 12 and enterprise network 14. Mobile station 28 may communicate through cellular network 12 using base station 18 and through enterprise network 14 using access point 20. Furthermore, mobile station 28 may interact with Call Manager 24 and/or mobility application 26 when appropriate, for example, to utilize PBX features to effect a handoff between cellular network 12 and enterprise network 14.

In operation, mobile station 28 may initiate and receive telephone calls through cellular network 12 and/or enterprise network 14 to establish communication sessions with remote devices. Note that, as used herein, a remote device refers to any communications device capable of establishing communications sessions with mobile station 28, such as devices located in cellular network 12, enterprise network 14, PSTN 16, or other linked networks. Furthermore, as used herein, a communication session refers to the transfer of voice, video, data, and/or other information between two or more communication devices. For example, according to particular embodiments a communication session may involve a call between two communication devices or a conference call involving two or more communication devices.

At any point in time, mobile station 28 may determine to handoff a communication session from cellular network 12 to enterprise network 14 or from enterprise network 14 to cellular network 12. For example, after establishing a communication session, mobile station 28 may lose or begin to lose connectivity with base station 18 or WLAN access point 20. Signal degradation may occur due to various causes. For example, mobile station 28 may begin to lose wireless connectivity due to physical movement. When possible, mobile station 28 may switch between using base station 18 and WLAN access point 20 for communications. Moreover, in certain circumstances mobile station 28 may maintain a communication session during handoff between cellular network 12 and enterprise network 14.

Handoff may occur when mobile station 28 travels from an area serviced by cellular network 12 to an area serviced by enterprise network 14. Handoff may also occur in the opposite direction, when mobile station 28 travels from an area serviced by enterprise network 14 to an area serviced by cellular network 12. However, handoff may occur at any other appropriate time. For example, handoff may occur when mobile station 28 is located in an area serviced by both network types due to a predetermined preference of one type of network, due to a spontaneous choice of a user of mobile station 28, or in response to analyzing error rates or other data associated with signaling provided by one or both types of networks. For example, error rates may be associated with signal strengths of base station 18 and access point 20, and may be dependent upon a location of mobile station 28.

After receiving a telephone call intended for mobile station 28, Call Manager 24 and/or mobility application 26 may include itself in a signaling path associated with the resulting communication session, whether the signaling path proceeds through cellular network 12 or enterprise network 14.

Note that communication system 10 represents only one embodiment of a system that supports handoff between cellular and enterprise wireless networks. Various alternative embodiments are possible. For example, while in the illustrated embodiment enterprise network 14 couples to cellular network 12 through PSTN 16 using gateway 22, various other embodiments may include enterprise network 14 coupling to cellular network 12 in other ways. For example, enterprise network 14 may couple to cellular network 12 using a service provider that supports VOIP. Thus, in alternative embodiments, cellular network 12 and gateway 22 may not be included in communication system 10.

Figure 2:
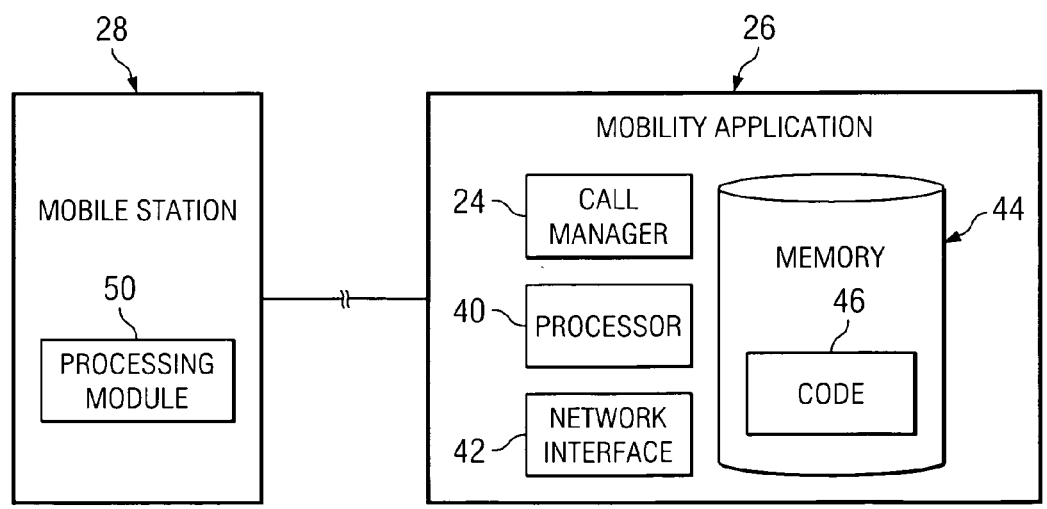
FIG. 2 is a block diagram illustrating functional components of a mobility application and a mobile station from the communication system.

FIG. 2 is a block diagram illustrating functional components of mobility application 26 and mobile station 28. In the embodiment illustrated, mobility application 26 includes Call Manager 24, as well as a processor 40, a network interface 42, and a memory 44. Mobile station 28 includes a processing module 50 in this particular embodiment, which is capable of recognizing, processing, and/or interpreting the incoming digits. Additionally, these functional elements can operate to support a handoff of active communication sessions when mobile station 28 roams between cellular network 12 and enterprise network 14. These elements of FIG. 2 facilitate the signaling recognition operations as outlined herein in this document.

Processing module 50 knows how to recognize cellular features (e.g. HOLD, resume, retrieve, call-waiting, conferencing, transfer, redirect, three-way calling, etc.), as the end user desires. It also knows how to react to this incoming signaling information. The abilities are present when mobile station 28 is on cellular network 12 or enterprise network 14.

Processor 40 controls the operation and administration of elements within mobility application 26. For example, processor 40 operates to process information received from network interface 42 and memory 44. Processor 40 includes any hardware and/or logic elements operable to control and process information. For example, processor 40 may be a programmable logic device, a microcontroller, a microprocessor, and/or any other suitable processing device. Processor 40 can also generate the signaling (i.e. place the call) to be received by mobile station 28.

Network interface 42 communicates information to and receives information from devices coupled to enterprise network 14. For example, network interface 42 may communicate with gateway 22, Call Manager 24, and access point 20. Furthermore, network interface 42 may receive information from and transmit information to remote devices as well as mobile station 28. Thus, network interface 42 includes any suitable hardware or controlling logic used to communicate information to or from elements coupled to mobility application 26.

Memory 44 stores, either permanently or temporarily, data and other information for processing by processor 40 and for communicating using network interface 42. For example, memory 44 may store the data, which indicates the condition to be communicated to mobile device 28. Memory 44 includes any one or a combination of volatile or nonvolatile local or remote devices suitable for storing information. For example, memory 44 may include random access memory (RAM), read only memory (ROM), magnetic storage devices, optical storage devices, or any other suitable information storage device or a combination of these devices. As illustrated, memory 44 may include one or more memory modules, such as code 46.

Code 46 includes software, executable files, and/or appropriate logic modules capable when executed to control the operation of mobility application 26. For example, code 46 may include executable files capable of supporting signaling between cellular network 12 and/or enterprise network 14 and mobile device 28. Code 46 may include instructions to enable mobility application 26 to initiate a call to mobile device 28.

Note that mobility application 26 may use any appropriate protocol to communicate with other elements of communication system 10. For example, mobility application 26 may utilize Java telephony application programming interface (JTAPI) to interact with Call Manager 24.

In operation of an example handoff, typically, a call associated with mobile station 28 is properly anchored by mobility application 26. In order to execute a handoff, a new cellular call must be made. Hence, mobile station 28 can make the cellular call over cellular network 12 and to mobility application 26, whereby a switch occurs over to that call leg. Mobility application 26 is handling multiple calls and multiple mobile stations.

When a call is placed, the call lands on mobility application 26, which recognizes (and is aware of) the call. Mobility application 26 collaborates with Call Manager 24 to switch (or to transfer [on the fly]) the call. In a similar, reciprocal fashion, when mobile station 28 moves back to enterprise network 14 it communicates with mobility application 26, which transfers the call from a cellular call leg to a voice over IP (VOIP) call leg.

While these previous examples includes specific functional components for mobility application 26 and mobile station 28, these elements may include any collection and arrangement of components, including some or all of the enumerated functional components, for supporting the signaling capability outlined herein. Moreover, mobility application 26 contemplates implementing each of the functional components using any suitable combination and arrangement of hardware and/or logic, and implementing any of the functionalities using a computer program stored on a computer-readable medium. Furthermore, mobility application 26 may be implemented as a stand-alone device, or aspects of mobility application 26 may be distributed among various devices within enterprise network 14. Alternatively, in some embodiments, mobility application 26 may be incorporated into Call Manager 24.

Turning now to FIG. 3, FIG. 3 is a simplified flowchart associated with a method for providing signaling operations in communication system 10. In operation of an example flow, consider a scenario where an end user is in enterprise network 14 and there is an incoming call, which was placed over a VOIP network (i.e. enterprise network 14). This call is anchored in mobility application 26 (i.e. enterprise network 14). This is illustrated by step 100.

At step 102, a caller ID is identified by mobility application 26. Mobility application 26 can then place a simple call to the mobile device at step 104. The call includes data that is indicative of some condition. The mobile device can process the incoming information, at step 106, in order to recognize some condition or issue that relates to this call. In this instance, the handset can receive information through the caller ID segment and interpret the accompanying digits to mean that some issue should be addressed by the end user in the enterprise network. Thus, at step 108, the mobile device can take specialized actions based on that information.

In another example, the phone could reside in the cellular network initially. In this scenario, which is only used for purposes of teaching, the end user will encounter a call-waiting issue. Thus, the end-user/mobile station 28 is in the cellular network on an active call, via mobility application 26 in the VOIP network. Mobility application 26 can place a second cellular call to the mobile with a call-waiting indication signal in the caller-id segment.

Mobile station 28 selects a unique call-ID for each new call it receives and sends this to mobility application 26 (e.g. using in-band DTMF signaling). This call-ID is then subsequently used as the call-reference in signaling. As outlined previously, the signaling can be done using in-band DTMF from mobile station 28 to mobility application 26, whereby the caller-ID segment for signaling propagates from mobility application 26 to mobile station 26.

Consider an example in which mobile station 28 has selected 1, for call #1, 2 for call #2, and 3 for call #3. If the end user is talking on call #1, and call #2 and call #3 are on hold, when call #2 clears, mobility application 26 can use the call-ID 2 in the caller-ID call-cleared signal, to indicate which call has cleared. Note that this offers only one example flow, as permutations to such a protocol are clearly within the broad scope of the present invention.

Note also that, typically, the only channels to get to the handset (with signaling information) are SMS (which is unreliable and which is slow), DTMF (from the handset to the network), and the actual GPRS connection, which is not active when the phone is on the call and which is not reliable either. The idea of placing a call to the handset (from specialized caller IDs) opens up a way of retrieving real-time commutations of commands (e.g. from a mobile station to a network entity (e.g. mobility application 26, IVR, etc.)). The phone relies on the handset's ability to scan the caller ID segment and take specialized actions based on that information.

Conceptually, this idea is not restricted to phones, provided that the wireless device has enhanced intelligence to facilitate the signaling process. Moreover, this concept could be applied broadly, as it could solve a number of problems not necessarily enumerated herein in this Specification. Other embodiments of this concept could offer the ability to facilitate 3rd party control issues or the ability to signal to the phone to initiate another call. Other applications involving various types of wireless devices (and their associated operations) are clearly within the broad scope of the present invention.

Note that while the preceding examples include specific functional components for mobile station 28, mobile station 28 may include any collection and arrangement of components, including some or all of the enumerated functional components, for processing signaling information. Moreover, mobile station 28 contemplates implementing each of the functional components using any suitable combination and arrangement of hardware and/or logic. Thus, in one embodiment mobile station 28 is a mobile phone. In other embodiments, mobile station 28 may be a personal digital assistant (PDA), any type of telephone, an electronic notebook, a laptop computer, or any other device operable to establish communications with cellular network 12 and enterprise network 14.

The preceding discussions illustrate particular methods for effecting signaling between cellular network 12 and enterprise network 14. However, these discussions illustrate only exemplary methods of operation. Furthermore, communication system 10 contemplates devices using any suitable techniques, elements, and applications for performing these functions. Thus, many of the steps in the discussions may take place simultaneously and/or in different orders than as shown or described. In addition, the devices may use methods with additional steps or fewer steps, so long as the methods remain appropriate. Moreover, other devices of communication system 10 may perform similar techniques to support signaling as outlined herein.

It is critical to note that the stages and steps in the FIGURES illustrate only some of the possible scenarios and operations that may be executed by, or within, the present system. Some of these stages and/or steps may be deleted or removed where appropriate, or these stages and/or steps may be modified, enhanced, or changed considerably without departing from the scope of the present invention. In addition, a number of these operations have been described as being executed concurrently with, or in parallel to, one or more additional operations. However, the timing of these operations may be altered. The preceding example flows have been offered for purposes of teaching and discussion. Substantial flexibility is provided by the tendered architecture in that any suitable arrangements, chronologies, configurations, and timing mechanisms may be provided without departing from the broad scope of the present invention. Accordingly, communications capabilities, data processing features and elements, suitable infrastructure, and any other appropriate software, hardware, or data storage objects may be included within communication system 10 to effectuate the tasks and operations of the elements and activities associated with executing suitable signaling functions.

Although the present invention has been described in detail with reference to particular embodiments, it should be understood that various other changes, substitutions, and alterations may be made hereto without departing from the spirit and scope of the present invention. The illustrated network architecture of FIG. 1 has only been offered for purposes of example and teaching. Suitable alternatives and substitutions are envisioned and contemplated by the present invention: such alternatives and substitutions being clearly within the broad scope of communication system 10. For example, the use of gateway 22 could be supplanted by bridges, switches, routers or any other suitable devices that are conducive to network communications.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims.

What is claimed is:

1. An apparatus for providing signaling in a network environment, comprising:
a mobile station operable to:
receive an existing call anchored by a mobility application in an enterprise network;
select a caller ID for the existing call, the caller ID comprising a uniquely identifying number, the caller ID being unique to the existing call to distinguish to the mobility application the existing call from a new call to the mobile station, the existing call and the new call anchored by the same mobility application, the caller ID allowing the mobility application to communicate a command of a private branch exchange (PBX) feature that applies to the existing call but not the new call in a caller ID segment of the caller ID;
send the caller ID to the mobility application;
receive the new call over a cellular network and anchored by the same mobility application as the existing call, the new call including the caller ID segment and the caller ID, the caller ID segment comprising the command of the PBX feature for the existing call, the caller ID uniquely identifying the existing call; and
facilitate execution of the command of the PBX feature for the existing call but not the new call.

2. The apparatus of claim 1, wherein the caller ID segment is received after the mobile station has roamed from the enterprise network to the cellular network and experienced a handoff.

3. The apparatus of claim 1, the feature being a selected one of a group of features, the group consisting of:
  1) HOLD;
  2) resume;
  3) retrieve;
  4) call-waiting;
  5) conferencing;
  6) transfer;
  7) caller ID;
  8) redirect;
  9) three-way calling; and
  10) barging operations.

4. The apparatus of claim 1, wherein the caller ID segment is used to signal to the mobile device to initiate another call.

5. The apparatus of claim 1, wherein the mobile station is operable to send the caller ID to the mobility application using in-band dual-tone multi-frequency (DTMF) signaling.

6. The apparatus of claim 1, wherein the caller ID segment is used to address a real-time condition associated with the mobile device.

7. The apparatus of claim 1, wherein the caller ID segment is used to address a third party control issue.

8. The apparatus of claim 1, wherein the mobile station is operable to initiate a handoff when the mobile station roams from the cellular network and back into the enterprise network.

9. A method for providing signaling in a network environment, comprising:
   receiving, at a mobile station, an existing call anchored by a mobility application in an enterprise network;
   selecting a caller ID for the existing call, the caller ID comprising a uniquely identifying number, the caller ID being unique to the existing call to distinguish to the mobility application the existing call from a new call to the mobile station, the existing call and the new call anchored by the same mobility application, the caller ID allowing the mobility application to communicate a command of a private branch exchange (PBX) feature that applies to the existing call but not the new call in a caller ID segment of the caller ID;
   sending the caller ID to the mobility application;
   receiving, at the mobile station, the new call over a cellular network and anchored by the same mobility application as the existing call, the new call including the caller ID segment and the caller ID, the caller ID segment comprising the command of the PBX feature for the existing call, the caller ID uniquely identifying the existing call; and
   facilitating execution of the command of the PBX feature for the existing call but not the new call.

10. The method of claim 9, wherein the caller ID segment is received after the mobile station has roamed from the enterprise network to the cellular network and experienced a handoff.

11. The method of claim 9, the feature being a selected one of a group of features, the group consisting of:
   1) HOLD;
   2) resume;
   3) retrieve;
   4) call-waiting;
   5) conferencing;
   6) transfer;
   7) caller ID;
   8) redirect;
   9) three-way calling; and
   10) barging operations.

12. The method of claim 9, wherein the caller ID segment is used to signal to the mobile device to initiate another call.

13. The method of claim 9, further comprising:
   sending the caller ID to the mobility application using in-band dual-tone multi-frequency (DTMF) signaling.

14. The method of claim 9, wherein the caller ID segment is used to address a real-time condition associated with the mobile device.

15. The method of claim 9, further comprising:
   initiating a handoff when the mobile station roams from the cellular network and back into the enterprise network.

16. A non-transitory computer readable medium comprising software for providing signaling in a network environment, the software comprising computer code such that when executed is operable to:
   receive, at a mobile station, an existing call anchored by a mobility application in an enterprise network;
   select a caller ID for the existing call, the caller ID comprising a uniquely identifying number, the caller ID being unique to the existing call to distinguish to the mobility application the existing call from a new call to the mobile station, the existing call and the new call anchored by the same mobility application, the caller ID allowing the mobility application to communicate a command of a private branch exchange (PBX) feature that applies to the existing call but not the new call in a caller ID segment of the caller ID;
   send the caller ID to the mobility application;
   receive, at the mobile station, the new call over a cellular network and anchored by the same mobility application as the existing call, the new call including the caller ID segment and the caller ID, the caller ID segment comprising the command of the PBX feature for the existing call, the caller ID uniquely identifying the existing call; and facilitate execution of the command of the PBX feature for the existing call but not the new call.

17. The medium of claim 16, wherein the caller ID segment is received after the mobile station has roamed from the enterprise network to the cellular network and experienced a handoff.

18. The medium of claim 16, wherein the caller ID segment is used to signal to the mobile device to initiate another call.

19. The medium of claim 16, wherein the code is further operable to:
   identify the established call and the new call by establishing a unique caller ID during call set-up of the new call received by the mobile station.

20. The medium of claim 16, wherein the caller ID segment is used to address a real-time condition associated with the mobile device.

21. The medium of claim 16, wherein the caller ID segment is used to address a third party control issue.

22. The medium of claim 16, wherein the code is further operable to:
   hand off the calls when the mobile station roams from the cellular network and back into the enterprise network.

* * * * *